(12) United States Patent
Rane et al.

(10) Patent No.: US 9,014,499 B2
(45) Date of Patent: Apr. 21, 2015

(54) DISTRIBUTED SOURCE CODING USING PREDICTION MODES OBTAINED FROM SIDE INFORMATION

(71) Applicant: Mitsubishi Electric Research Laboratories, Inc., Cambridge, MA (US)

(72) Inventors: Shantanu Rane, Cambridge, MA (US); Robert A. Cohen, Somerville, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 22 days.

(21) Appl. No.: 14/036,385

(22) Filed: Sep. 25, 2013

(65) Prior Publication Data

US 2015/0085920 A1 Mar. 26, 2015

(51) Int. Cl.
- *G06K 9/00* (2006.01)
- *H04N 19/124* (2014.01)
- *H04N 19/503* (2014.01)
- *H04N 19/593* (2014.01)
- *H04N 19/60* (2014.01)

(52) U.S. Cl.
CPC ..... *H04N 19/0009* (2013.01); *H04N 19/00575* (2013.01); *H04N 19/00763* (2013.01); *H04N 19/00775* (2013.01)

(58) Field of Classification Search
CPC ..... H04N 19/395; H04N 19/48; H04N 19/50; H04N 19/89; H03M 13/1197; H03M 13/6312; H03M 7/30; H03M 7/3057
USPC ......... 382/232, 233, 246, 245, 248, 250, 251, 382/253; 375/240.02, 240.03, 240.25, 375/240.18, 240.17
See application file for complete search history.

(56) References Cited

U.S. PATENT DOCUMENTS

| | | | |
|---|---|---|---|
| 7,400,774 B2 | 7/2008 | Puri et al. | |
| 8,194,737 B2* | 6/2012 | Nishi | 375/240.12 |
| 8,428,379 B2 | 4/2013 | Rane et al. | |
| 2009/0103606 A1* | 4/2009 | Lu et al. | 375/240.02 |
| 2010/0034290 A1* | 2/2010 | Lakus-Becker | 375/240.25 |
| 2013/0177073 A1* | 7/2013 | Yamasaki | 375/240.03 |

OTHER PUBLICATIONS

B. Girod, A. Aaron, S. Rane, D. Rebollo-Monedero, "Distributed Video Coding", Proceedings of the IEEE, Special Issue on Advances in Video Coding and Delivery, Invited Paper, vol. 93, No. 1, pp. 71-83, Jan. 2005.

A. Aaron, D. Varodayan, and B. Girod, "Wyner-Ziv Residual Coding of Video," Proc. International Picture Coding Symposium, Beijing, P. R. China, Apr. 2006.

D. Varodayan, A. Aaron and B. Girod, "Rate-adaptive codes for distributed source coding", EURASIP Signal Processing Journal, Special Section on Distributed Source Coding, vol. 86, No. 11, pp. 3123-3130, Nov. 2006.

* cited by examiner

*Primary Examiner* — Ali Bayat
(74) *Attorney, Agent, or Firm* — Dirk Brinkman; Gene Vinokur

(57) ABSTRACT

In a decoder, a desired image is estimated by first retrieving coding modes from an encoded side information image. For each bitplane in the encoded side information image, syndrome bits or parity bits are decoded to obtain an estimated bitplane of quantized transform coefficients of the desired image. A quantization and a transform are applied to a prediction residual obtained using the coding modes, wherein the decoding uses the quantized transform coefficients of the encoded side information image. The estimated bitplanes of quantized transform coefficients of the desired image are combined to produce combined bitplanes. Then, an inverse quantization, an inverse transform and a prediction based on the coding modes are applied to the combined bitplanes to recover the estimate of the desired image.

10 Claims, 4 Drawing Sheets

DISTRIBUTED SOURCE CODING USING PREDICTION MODES OBTAINED FROM SIDE INFORMATION

FIELD OF THE INVENTION

The invention relates generally to distributed source coding, and more particularly to distributed source coding applied to a set of correlated images.

BACKGROUND OF THE INVENTION

Distributed source coding (DSC) encodes correlated data from multiple sources that do not communicate with each other. By modeling a correlation between multiple sources in a decoder with channel codes, DSC shifts the computational complexity from an encoder to the decoder. Therefore, DSC is frequently used in applications with complexity and resource constrained encoders, such as those used in simple sensors, satellite imagery, and multimedia encoding in battery-operated consumer devices such as mobile telephones and digital tablets. In DSC, the correlated sources are encoded separately but decoded jointly. As an advantage, separate encoding of the sources can be performed with low computational overhead and simpler circuitry.

DSC is based on a lossless Slepian-Wolf entropy bound, which guarantees that two isolated encoders can encode correlated data as efficiently as though the encoders are communicating with each other. For the special case of jointly Gaussian sources, Wyner-Ziv bounds on the rate-distortion performance of a distributed codec also ensure that there is no loss with respect to conditional encoding, i.e., the case where the encoders are communicating with each other. DSC has been applied to images, videos and biometric data.

The most common method of implementing DSC to encode a correlated image, in the presence of a correlated side information image at the decoder, involves the use of a low density parity check (LDPC) code. That method first extracts bitplanes from the input image, either directly from quantized pixels or indirectly from a quantization of the transformed version of the image. Typically used transforms include blockwise transforms, such as a two-dimensional discrete cosine transform (DCT), a two-dimensional discrete wavelet transform (DWT), a H.264/AVC (Advanced Video Coding) transform, etc. After obtaining the bitplanes, each bitplane is subjected to LDPC encoding, and produces syndrome bits. Typically, the number of syndrome bits is smaller than the number of bits in the encoded bitplane.

To perform the decoding, the method makes use of an image that is statistically correlated with the image that was encoded. That image is referred to as a side information image. Bitplanes are extracted from the side information image, either directly from quantized pixels in that image, or from a quantization of the transformed version of the image. The bitplanes provide an initial estimate of the bitplanes of the desired image that is to be recovered. The initial estimate is fed to the LDPC decoding procedure in the form of log-likelihood ratios (LLRs), where positive LLRs indicating a higher likelihood of a decoded bit value of 0 and negative LLRs indicating a higher likelihood of a decoded bit value of 1. The LDPC decoding procedure is performed separately for each bitplane.

To decode each bitplane, the decoder takes as input the syndrome bits received from the encoder corresponding to that bitplane, and the LLRs determined for each bit using the corresponding bitplane of the encoded side information image, as explained above. Then, the decoder performs belief propagation to output an estimate of the decoded bitplane. Finally, the bitplanes are combined to produce the quantized transform coefficients, and then the quantization and transforms are reversed to give the desired decoded image.

This technique is useful when the encoding is highly constrained and has requirements of low computation complexity, low circuit complexity, or low power consumption. Because syndrome encoding typically has a smaller complexity than conventional image encoding procedures, such as Joint Photographic Experts Group (JPEG), JPEG2000, H.264/AVC, High Efficiency Video Coding (HEVC), etc, encoding one or more images in this distributed manner is beneficial, compared to encoding all the images using a standard encoding procedure.

Decoders for these applications, e.g., sensor networks, satellite data compression, etc., can typically tolerate a higher complexity or power consumption than the encoder. An advantage is that, for the same low-complexity encoder, sophisticated decoders can be designed, which better exploit the statistical correlation between the source image and the side information image, thereby achieving a syndrome rate that approaches the ideal Wyner-Ziv coding bounds.

SUMMARY OF THE INVENTION

The embodiments of the invention provide a method for performing distributed source coding (DSC) of an image using a statistically correlated side information image.

In conventional DSC, the image is encoded using syndrome coding while the statistically correlated side information is encoded using a standardized encoder/decoder (codec) such as JPEG, JPEG2000, H.263, H.263+, H.264/AVC. A common feature of all the prior art methods is that the image and the side information image are either in the form of quantized pixels or quantized transform coefficients derived from the quantized pixels. One exception is a residual Wyner-Ziv coding method, in which the side information image is encoded with standard codecs, but the image is encoded by transmitting the syndrome of the quantized residual pixels or the quantized residual transform coefficients, wherein the "residual" is determined by a difference between the image and a side information image.

In contrast with the prior art, the present invention uses a method in which both the side information image and the input image are encoded using residual coding. Furthermore, the "residual" is determined differently in the invention than in the prior art. The residual for the side information image is determined by taking a difference between the side information image block being encoded and another side information image block. Similarly, the residual for the input image is determined by taking the difference between the input image block being encoded and another input image block. Note that this differs from the prior art because the residuals are determined from the same image, and no differencing operation is performed between the input image and side information image.

This invention specifies that rate distortion-optimal coding mode can be determined for the side information image in a standard compatible setup such as H.264/AVC or HEVC. To make the method practically realizable, the coding mode is inherited and reused for the input image that is to be syndrome-coded. Examples of the coding mode include, but are not limited to, the motion vector for inter prediction, or the prediction direction for intra prediction.

This sharing of coding modes between a standardized encoding and the syndrome coding is one feature of the invention.

Herein, the term intra prediction is used to refer to the operation of predicting a block of pixels of an image or predicting a block of transform coefficients of an image, using another block of pixels in the same image, or another block of transform coefficients of the same image. Inter prediction is used to refer to the operation of predicting a block of pixels of an image or predicting a block of transform coefficients of an image, using another block of pixels in a different image, or another block of transform coefficients of a different image.

This invention is based on the realization that computing optimal intra prediction modes only for the side information image, and reusing the modes for the input image has the following benefits: The predictive coding improves encoding for the side information image because encoding prediction residuals is generally more efficient than coding pixels. More important, using predictive coding for the input image results in a large number of zero bits in the bitplanes of quantized transform coefficients, thus providing opportunities to improve the performance of syndrome coding, i.e., distributed coding of the prediction residuals.

The advantages of the invention are as follows. As described above, the incorporation of inter or intra prediction results in improvement of encoding for the side information image. If the prediction is performed correctly, then the prediction residual is small in magnitude, and many of the pixels or transform coefficients in the prediction residual are zero. This improves the efficiency of practical syndrome coding procedures based on LDPC codes. Furthermore, because the coding modes used for the input image are inherited from those used for the side information, no extra bandwidth is used up at the encoder in transmitting the coding modes for the input image. At the decoder, the side information image is decoded first, and its coding modes are simply reused while decoding the input image.

DETAILED DESCRIPTION OF THE PREFERRED EMBODIMENTS

Detailed Method Overview

Figure 1:
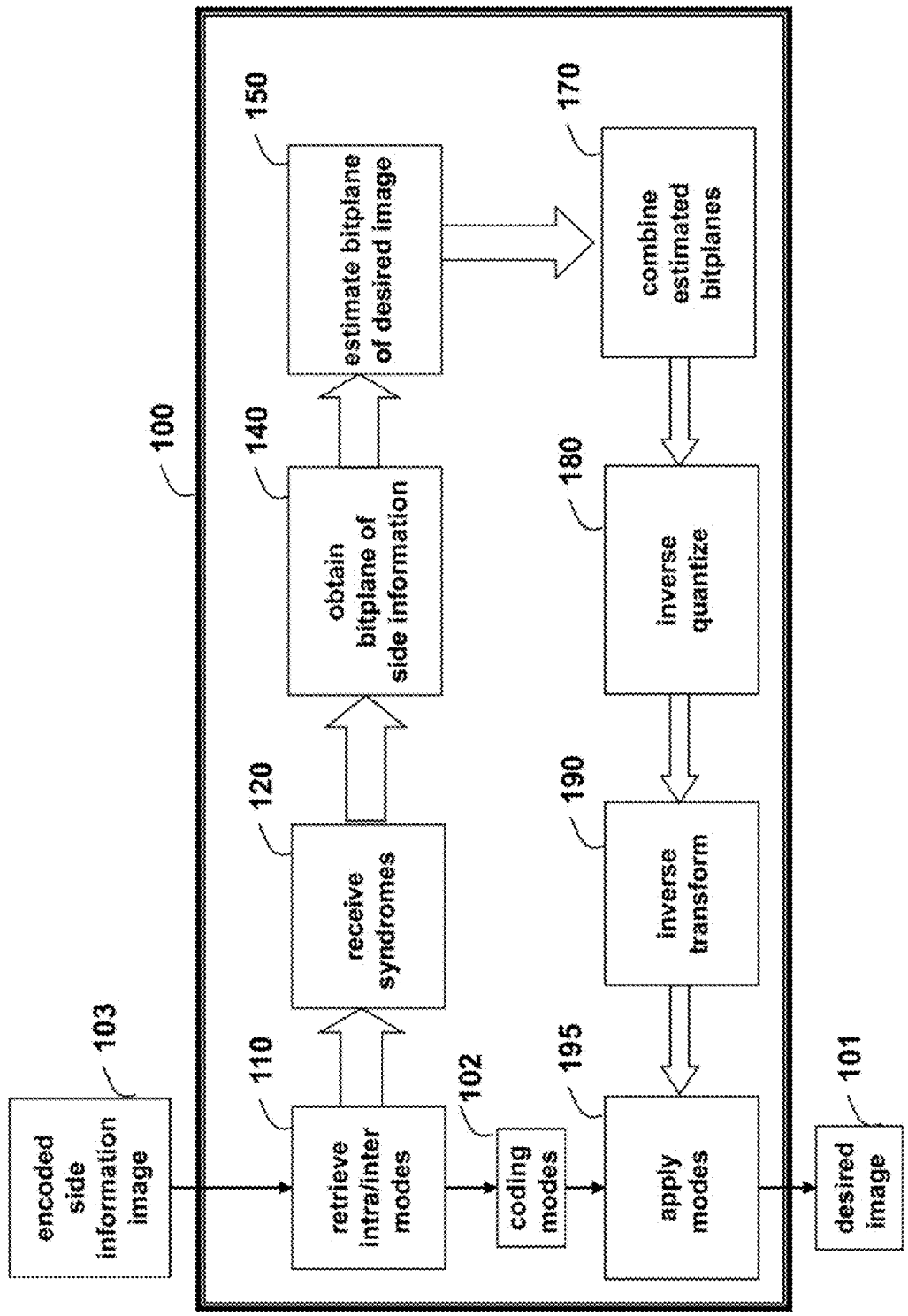
FIG. 1 is a flow diagram for recovering an estimate of a desired image using coding modes obtained from side information according to embodiment of the invention.

FIG. 1 is a flow diagram of a distributed source coding (DSC) method for recovering an estimate of a desired image 101 from an input image using intra and inter prediction coding modes 102 retrieved 110 from encoded side information image 103 according to embodiment of our invention. The method can operate in a decoder 100. The decoder can be implemented, in part, using a processor connected to memory and input/output interfaces connected by buses.

From an encoder, storage device or encoded bit stream, the decoder receives 120 syndrome bits or parity bits applied to bitplanes of quantized transform coefficients of the desired image. The bitplanes use a sign-magnitude representation of the quantized transform coefficients. The quantization and transformation are applied to prediction residuals obtained using the intra or inter prediction modes.

A bitplane of the quantized and transformed coefficients of the side information image is also obtained 140.

A bitplane of the quantized transform coefficients of the desired image is estimated 150 from the syndrome bits or parity bits, using a corresponding bitplane of the quantized transform coefficients of the side information image, the coded block pattern values and values of any previously decoded bitplanes of the quantized transform coefficients of the desired image. The use of the coded block pattern values is explained in detail below.

Then, the estimate of the desired image is recovered by combining 170 all estimated bitplanes of quantized transform coefficients of the desired image, applying an inverse quantization 180, an inverse transform 190, and the intra or inter prediction modes 195 to the combined bitplanes to recover an estimate of the desired image 101.

Application

The recovery method is applicable for a variety of data types, including images, videos, or other multidimensional data. In one embodiment, we consider two correlated images, e.g., an input image, and a statistically correlated side information image.

The method is also applicable for a wide variety of procedures for side information image encoding. These can be any standardized encoding procedure or modifications thereof, including JPEG, JPEG2000, H.264/AVC, HEVC, and others. For concreteness, the embodiments are described for HEVC.

The invention uses DSC for the input image, which can be performed using turbo codes, LDPC codes, LDPC accumulate (LDPCA) codes, convolutional codes, iterative repeat accumulate (IRA) codes, raptor codes, fountain codes, and the like. We describe embodiments for LDPCA codes, i.e., the distributed source coding procedure involves generating syndromes from the quantized transform coefficients of prediction residuals of the input image using an LDPCA code. The embodiment use belief propagation for decoding. The belief propagation scheme uses a factor graph with factor nodes and variable nodes as known in the art.

The embodiments described herein are also applicable to intra prediction and inter prediction. In one embodiment, we consider intra prediction, as implemented according to the HEVC video coding standard. In HEVC intra prediction, the transform coefficients of encoded blocks are predicted from transform coefficients in adjacent blocks, specifically the blocks to the top and left of a current block being encoded. The cost of an intra prediction mode is a sum of the cost of encoding the residual error between the coefficients of the current block being encoded and the predicted coefficients according to the chosen intra prediction mode, and the cost of encoding the chosen intra prediction mode.

Figure 2:
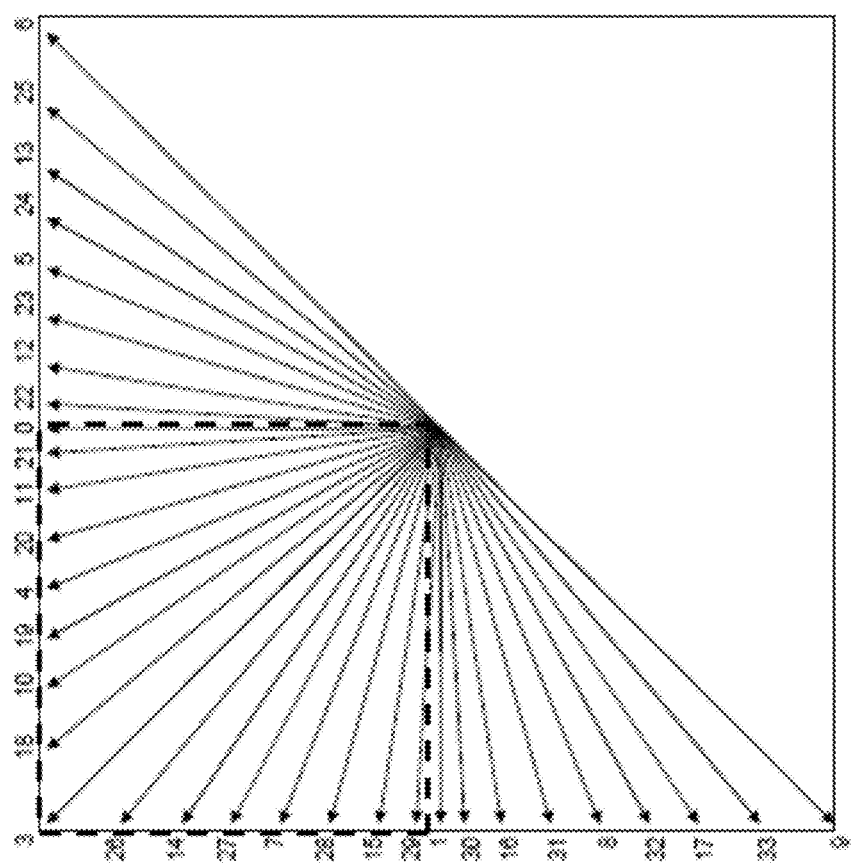
FIG. 2 is a schematic of 34 directional intra prediction modes, wherein the intra prediction modes constitute one example of coding modes.

The best prediction mode is obtained by calculating the rate-distortion (RD) cost for each of 34 directional intra prediction modes as shown in FIG. 2, and then selecting the mode with the lowest rate-distortion cost.

Encoding Procedure for Side Information Image

Figure 3:
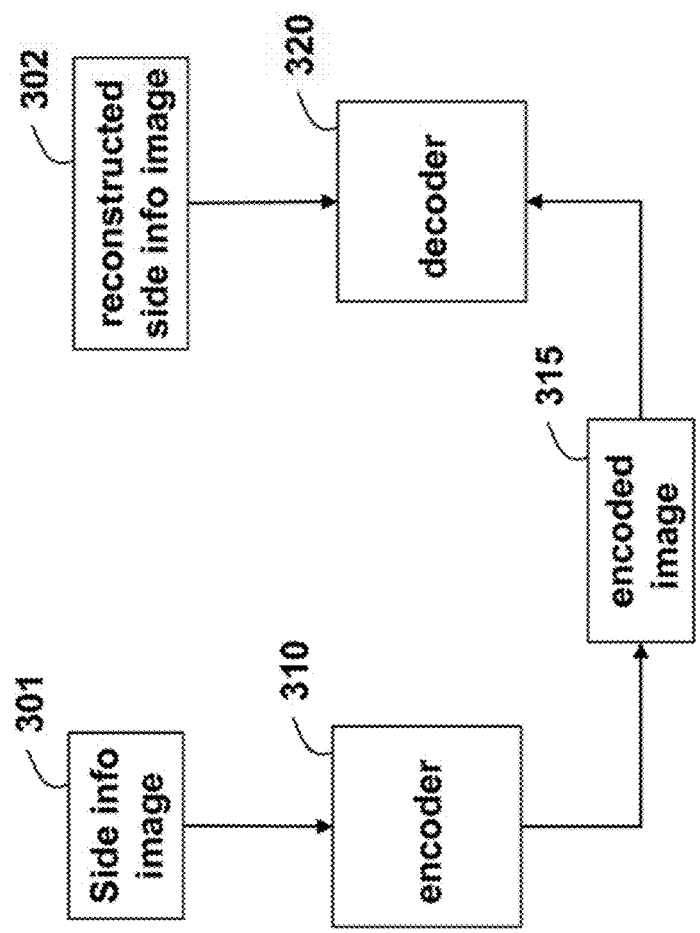
FIG. 3 is a flow diagram of an encoder/decoder for the side information image according to embodiments of the invention.

FIG. 3 shows a typical encoder/decoder (codec) 300 that can be used with the embodiments of the invention. Input to the encoder is an original side information image 301, or any other type of multimedia or biometric data, such as a video, fingerprints and the like. Output is an encoded image 315. The encoded image can be stored for later processing by the decoder 320, or transmitted as a bitstream.

A decoder 320 recovers a reconstructed (desired) side information image 302 from the encoded image. The encoder and decoder can be implemented in a single or multiple processors as known in the art. Frequently, a single commercial encoder produces encoded data for an extremely large number of consumer decoders In the preferred embodiment, the side information image is encoded using HEVC intra coding to produce a standard-compatible HEVC bit stream. The intra prediction modes used in HEVC coding of the side information image are stored and reused for coding of the input image as described below. Thus, in this embodiment, the coding modes are the intra prediction modes. In HEVC, macroblocks used with previous video standards are replaced by coding tree units (CTUs). CTUs can be partitioned into coding tree blocks (CTBs), of e.g., 64×64, 32×32, or 16×16 pixels. CTBs can be partitioned into one or more coding units (CUs).

Encoding Procedure for Input Image

1. For each 2-dimensional CU of the input image, intra-prediction is performed on the input image using the mode used during intra coding of the side information image. If the HEVC encoder had determined the intra-prediction modes for intra coding of the input image CUs, the modes, in general, would be different from the modes used for intra coding of the CU's in the side information image. Therefore, the encoder is forced to use the intra prediction modes used for the side information image. As described above, this has the advantage that no extra bandwidth is used to signal the intra prediction modes used for the input image. The output of this step is a prediction residual signal in the CU, which is a 2-dimensional signal with the same number of entries as the number of pixels originally present in the CU.

2. For each transform unit in each CU, a 2-D block-based HEVC transform is performed. To maximize a correlation between the transform coefficients of the input image and side information image, the transform matrix elements and the transform block size is the same as that used during the encoding of the corresponding portion of the side information image. The output of this step is a transform-coded prediction residual signal in each CU.

3. Then, uniform quantization of the transform coded prediction residual signal is performed using the prescribed quantization parameter. In the preferred embodiment, the quantization parameter (QP) is the same as that used in the side information image. However, this is not an absolute requirement. Depending upon the dynamic range and probability distribution of the pixel values of the input image, it is possible to use a different QP value for quantizing the input image. The output of this step is a quantization index for each transform-domain prediction residual value, in each transform unit, in each CU. For example, if the transform unit (TU) size is 32×32, then there are 1024 quantization indices, (each corresponding to a residual value) in each TU.

4. Each quantization index is converted to bitplanes using a sign-magnitude representation. The number of bitplanes used is determined according to a maximal magnitude transform coefficient generated from the previous step. For example, if the largest transform coefficient has a value 212, then a quantization index will be converted to at most $1+\text{ceiling}(\log_2(212))=9$ bitplanes, i.e., one sign bitplane and 8 magnitude bitplanes.

5. Syndrome coding of each bitplane is performed independently. Thus, if there are 1024 transform coefficients, and 8 bitplanes per transform coefficient, then the syndrome coding is performed 8192 times. In practice, the number of syndrome coding operations is significantly smaller than 8192, because only a relatively small number of lower frequency coefficients are large enough to need several bitplanes. The higher frequency coefficients are small or zero-valued, thus requiring few or no syndrome coding operations. Any number of channel codes can be used for syndrome coding, depending upon the complexity and storage requirements of the encoding system. The preferred embodiment uses an LDPC code. However, turbo codes, IRA codes, raptor codes, convolutional codes etc., can also be used.

6. All the generated syndromes are eventually received by the decoder 430 of the input image.

Decoding Procedure for the Side Information Image

In the example embodiment, the side information image is decoded 320 using HEVC intra decoding.

Basic Decoding Procedure for the Input Image

Figure 4:
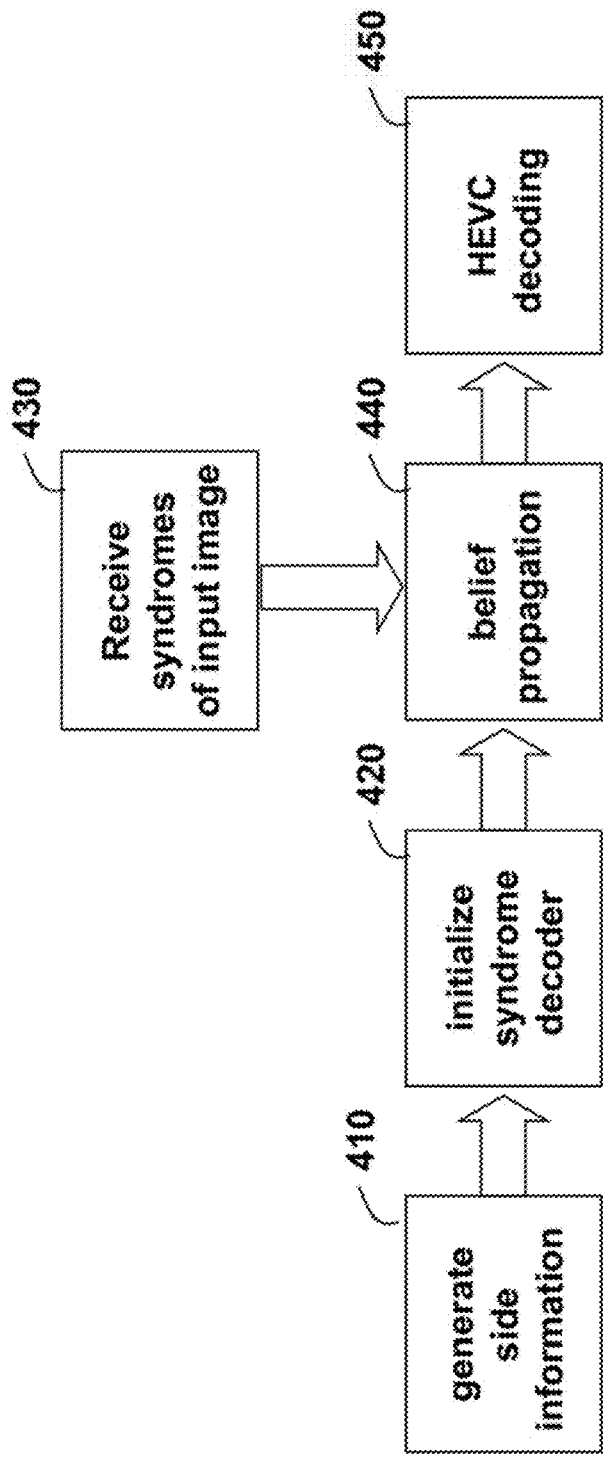
FIG. 4 is a flow diagram of details of the decoder according to embodiments of the invention.

The decoder 100 receives 120 the syndromes of the input image, and also obtains 140 the decoded side information image (or the partially decoded bit stream of the side information image) to form the desired decoded image 101 using the following steps as shown in FIG. 4:

A. Generation of Side Information—410

1. The HEVC bit stream is decoded to obtain the quantized transformed prediction residual, which constitutes the side information. The side information is in the form of vectors of quantization indices for each of the transform coefficients. Thus, if the TU size is fixed to 32×32 pixels, then 1024 vectors of quantization indices are obtained per TU at the end of this step.

2. For each transform coefficient, the vector of quantization indices are decomposed into bitplanes. A bitplane is composed of a particular bit taken from a quantized transform coefficient at the same location in every TU in the input image or side information image. Thus, for a 1600×1600 pixel image with a TU size of 32×32, the bitplane corresponding to the most significant bit of the DC coefficient would be of length (1600×1600)/(32×32) =2500. Similarly, the bitplane corresponding to the second least significant bit of the AC1 coefficient would also be of length 2500. The total number of bitplanes per transform coefficient is one more than the logarithm of the magnitude of the largest quantization index in the vector of quantization indices for a particular transform coefficient. For each transform coefficient, these bitplanes serve as side information for the decoding of the corresponding syndrome bitplanes received from the input image.

B. Initialization of the Syndrome Decoder (for Each Bitplane of Each Transform Coefficient)—420

1. To initialize the decoder, the syndrome vector for the LDPC decoder is determined according to the syndrome bitplane under consideration. The variable nodes of the LDPC decoder are determined according to the corresponding bitplane for the corresponding transform coefficient obtained in the Step A from the side information image.

2. Determine the Log-likelihood ratio (LLR) for each of the variable nodes of the LDPC coder using the bits in the variable nodes, and the channel model. The channel model specifies the probability that the bit in a variable node changes value after passing through the side information channel. In other words, if the bit value for a quantization index for a particular transform coefficient of the side information image is assumed to be correlated with the corresponding bit in the input image, such that the value inverts with a probability p, then the LLR for that bit is given by $1-2*(\text{side information bit value})*\log((1-p)/p)$. A large positive value of LLR indicates that the input bit being decoded in that position is very likely to be zero. Conversely, a large negative value of LLR indicates the belief that the input bit being decoded in that position is very likely to be of value one.

C. Receive Syndromes of the Input Image—430

1. The procedure for generating syndromes of the input image are described above in the section on encoding the input image. These syndromes are received and used as input for the belief propagation algorithm that is described below. As described above, the number of syndromes received for each bitplane of each quantized transform coefficient depends on the rate of the LDPC code (or in general, the channel code) that is chosen for that particular bitplane and transform coefficient. The goal of the belief propagation algorithm is to decode these syndromes are recover the bitplanes of the quantized transform coefficients of the input image.

D. Belief Propagation—440

1. For each bitplane of each transform coefficient, after performing the above initialization, perform belief propagation decoding. After obtaining an estimate of the LLR that is stable and does not change from iteration to iteration, or after running belief propagation for a pre-specified number of iterations, read the LLR value in the variable nodes, and threshold the value according to the rule that a negative LLR means a decoded bit value of 1, and a positive LLR means a decoded bit value of 0.

E. Decoding Using HEVC—450

1. After obtaining the bitplanes of each quantized transform coefficient, the quantization index vectors corresponding to each transform coefficient of the input image is recomposed.
2. The quantization indices are rearranged into blocks, and the quantization 180 and transform 190 operations are reversed to obtain reconstructed pixels of the input image.

Process of Improving the Decoding Efficiency Using the Coded Block Pattern

Our method also provides a method for improving encoding efficiency by exploiting a Coded Block Pattern (CBP) from the HEVC encoded side information bit stream and the CBP for the input image. The CBP corresponds to the CUs that where all quantization indices are zero. This is signaled by setting the CBP flag in the HEVC bit stream of the side information image. If the CBP flag is set, then the corresponding quantization indices are not transmitted in the HEVC bit stream of the side information image.

For the input image, even when the CBP flag is set, the bitplanes of the quantization indices need to be transmitted in the distributed Wyner-Ziv bit stream for synchronization purposes. However, by examining the CBP flags, we can leverage the knowledge that the quantization indices are all zero.

The CBP of the input image can be obtained directly at the decoder from the encoder, or syndromes of the CBP of the input image can be received from the encoder, and then syndrome decoding can be performed to obtain the CBP bitplane for the input image using the recovered CBP bitplane of the side information image as side information.

Improvement in coding efficiency based on the bits in the CBP is achieved using the following steps.

1. Obtain the CBP of the input image as described above.
2. During the decoding of bitplanes of quantization indices of transform coefficients, check whether the CBP flag for the coding unit under consideration, i.e., for particular quantization indices within the coding unit under consideration, is set. If yes, set all the LLRs of the magnitude and sign bits of these quantization indices to infinity—or practically to a very large value. This forces the bits to be decoded as zero.

As a consequence, the number of constraint equations in the LDPC decoding is increased, thereby increasing the strength of the error correcting code, and hence the efficiency of the decoding process. Specifically, the increase in efficiency is manifested in the form of a decrease in the number of magnitude and sign bit syndromes that need to be transmitted for the input image.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for estimating a desired image, comprising:
   retrieving coding modes from an encoded side information image;
   decoding, for each bitplane in the encoded side information image, syndrome bits or parity bits to obtain an estimated bitplane of quantized transform coefficients of the desired image, wherein a quantization and a transform are applied to a prediction residual obtained using the coding modes, wherein the decoding uses the quantized transform coefficients of the encoded side information image;
   combining the estimated bitplanes of quantized transform coefficients of the desired image to produce combined bitplanes; and
   applying an inverse quantization, an inverse transform, and a prediction based on the coding modes to the combined bitplanes to recover the estimate of the desired image, wherein the steps are performed in a decoder.

2. The method of claim 1, wherein the bitplanes use a sign-magnitude representation of the quantized transform coefficients.

3. The method of claim 1, wherein the decoding estimates a log-likelihood ratio.

4. The method of claim 3, wherein the log-likelihood ratio is based on a coded block pattern, wherein the coded block pattern has a value of zero when all quantized and transformed prediction residuals of a transformed block of the desired image are zero, and a value of one otherwise.

5. The method of claim 4, wherein the estimating further comprises:
   locating bits in the bitplane that correspond to the coded block pattern with the value of zero; and
   fixing the log-likelihood ratio of the bits to infinity or a very large value, thereby fixing the decoded value of the bits to zero.

6. The method of claim 1, further comprising:
   decoding the syndrome bits or the parity bits to obtain an estimated bitplane of coded block pattern values for the desired image, wherein the decoding uses the coded block pattern values of the side information image.

7. The method of claim 1, wherein the coding modes include intra or inter prediction modes.

8. The method of claim 1, wherein the coding modes include prediction block partitioning information.

9. The method of claim 1, wherein the coding modes include transform block partitioning information.

10. The method of claim 1, wherein the coding modes include transform type information.

* * * * *